July 12, 1966  W. KAUERT  3,260,230
SAIL CONTROLLING MEANS
Filed Oct. 12, 1964
5 Sheets-Sheet 1
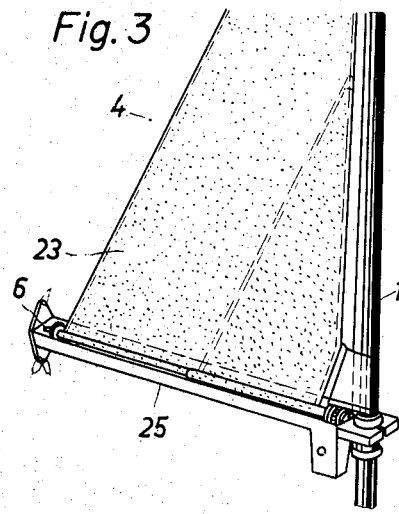
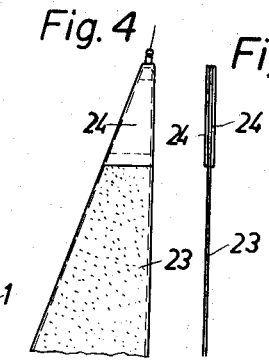
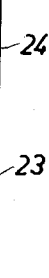
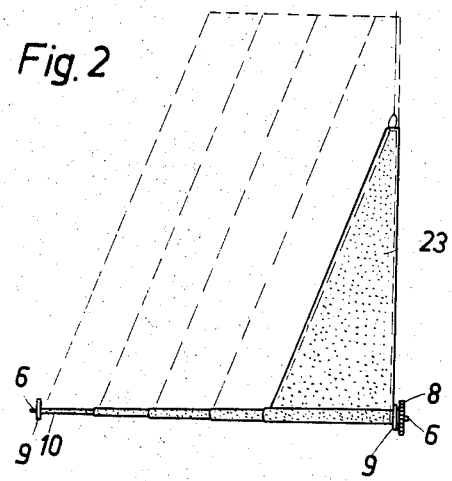
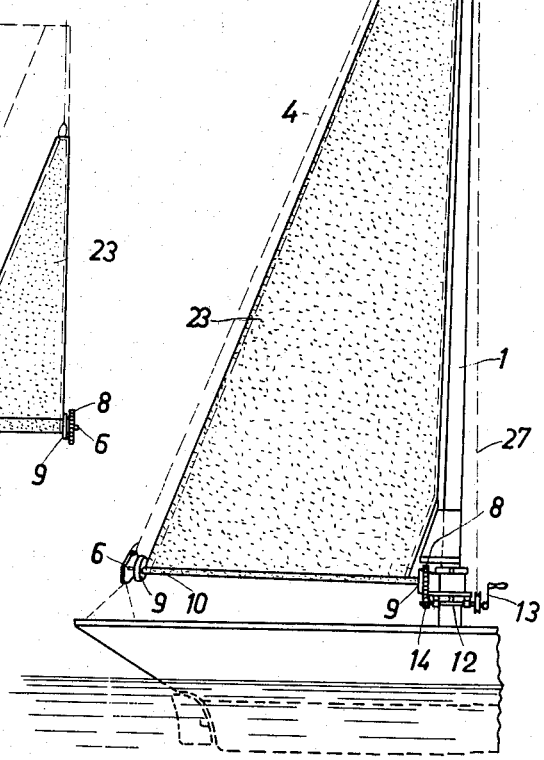

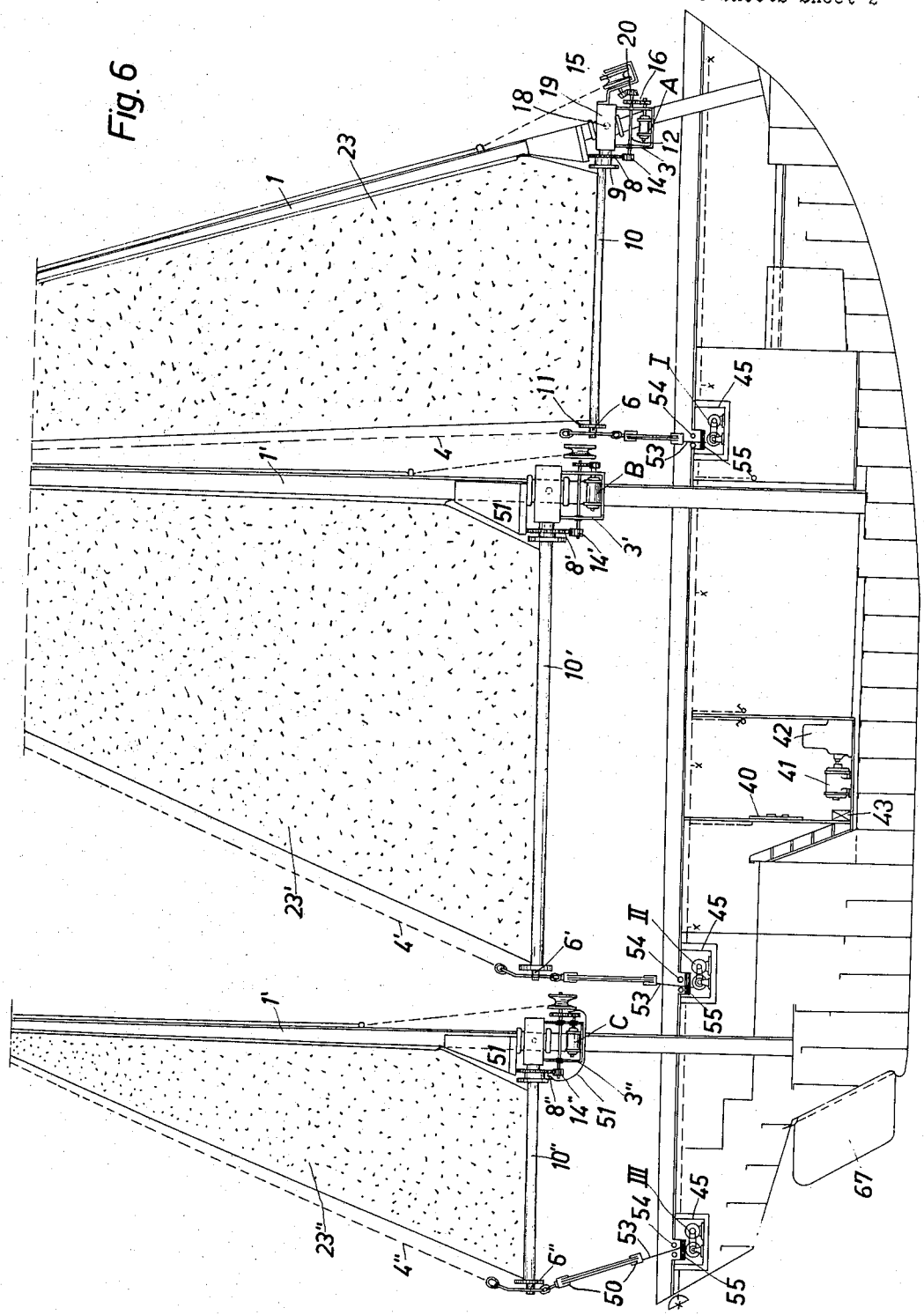

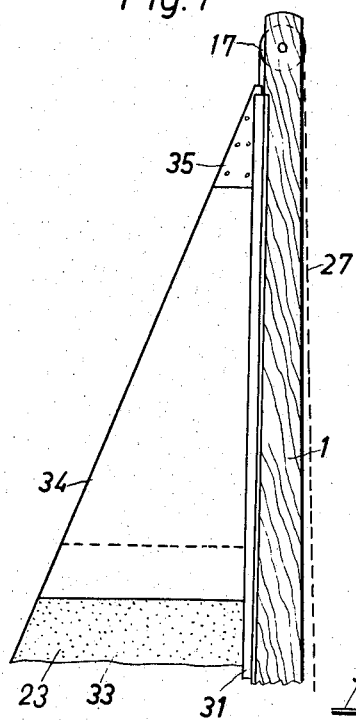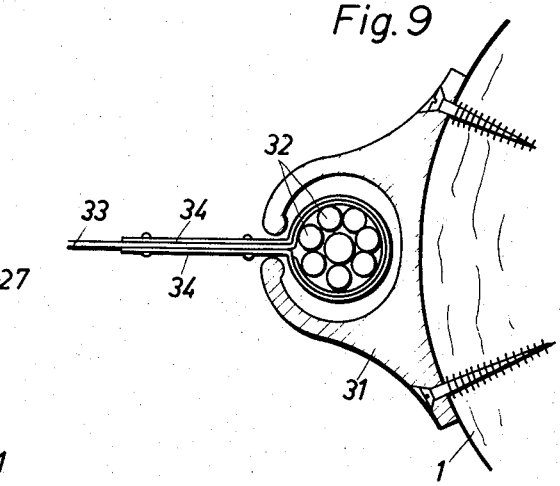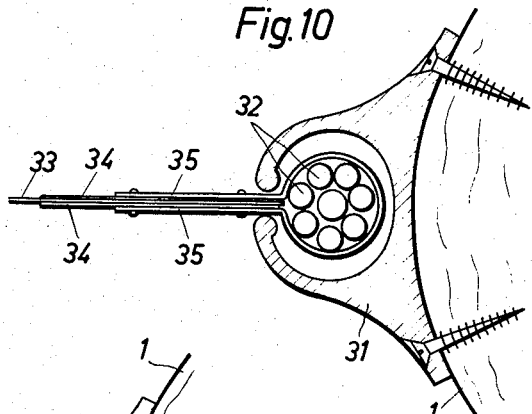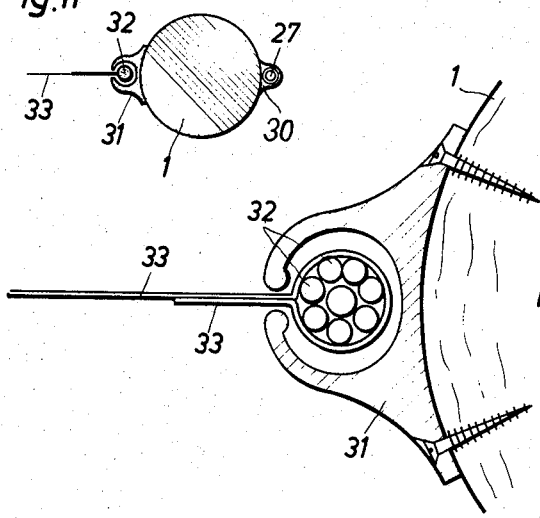

July 12, 1966 W. KAUERT 3,260,230
SAIL CONTROLLING MEANS
Filed Oct. 15, 1964 5 Sheets-Sheet 4

United States Patent Office 3,260,230
Patented July 12, 1966

3,260,230
SAIL CONTROLLING MEANS
Walter Kauert, Hektorstr. 2, Berlin, Germany
Filed Oct. 12, 1964, Ser. No. 403,304
11 Claims. (Cl. 114—102)

The present invention relates to control gear for sailboats, particularly sailboats having a plurality of sails which can be reefed by being rolled onto the respective booms. The term "sailboat" is herein used in a generic sense to include ships or vessels provided with sails regardless of size.

Hauling sails up and down is arduous, particularly in the case of large riggings. However, it can be true even with respect to smaller sailboats if the crew is made up of persons who are inexperienced, very young, or elderly, Even experienced sailors will sometimes meet with difficulties in controlling a sailing boat in the event of rough weather or suddenly changing weather conditions. This is particularly true when sail changes must be made quickly for example in the course of the race or when the safety of the vessel depends on rapid manipulation of the sails.

It is an object of the present invention to avoid such difficulties. In accordance with the invention, the sails are coiled on roller booms and the hoisting and reefing of the sails is controlled electrically so that each sail may be separately or partially wound up on or unwound from the respective roller boom to provide the exact sail area desired under prevailing conditions. Moreover, the trimming of the sails by orientation of the booms with respect to the longitudinal axis of the vessel is also controlled electrically. Preferably the motors controlling the hoisting of the sails operate step-wise so that the sails can be partially coiled up or coiled off in predetermined stages. The motor controlling the orientation of the booms, on the other hand, are infinitely variable so that the booms can be oriented exactly in the position desired. The control system in accordance with the present invention, preferably includes a central control panel from which all of the sails can be fully controlled both separately and jointly.

Thus each sail is provided with two electric motors one for controlling the effective sail area and the other controlling the position or orientation of the sail. Moreover, the hoisting of each sail by means of a halyard and electrically operated winch is coordinated with the rotation of the roller boom so that as a sail is hoisted, it is unrolled from the boom and as it is lowered, it is rolled up on the boom, thereby keeping the sail tight at all times. The motor controlling the orientation of each boom is operable to control the position of the sail both on the port and starboard side. The equipment is capable of handling vessels with any number of sails, for example yawls or ketches having a foresail, mainsail and mizzen sail. Thus, the full complement of sails can be fully controlled, for example by push-button switches for controlling the sail area in selected steps and rotary switches controlling the exact position of the booms on either the port or starboard side of the vessel.

By reason of the way in which sails are handled with the control system of the present invention, the possibility of sails being torn or otherwise damaged during handling is virtually eliminated. The life of sails is thereby substantially increased. Moreover, the rigging in accordance with the present invention makes it possible to remove and replace sail quickly and easily, merely by slipping one roller tube—with the sail wound thereon—off of the boom and replacing it by another tube having a sail wound thereon.

The sail cloth may be made of plastic material, natural fiber such as cotton, or synthetic fiber such as Dacron.

Preferably the head portion of the sail or a portion of the halyard is made elastic so as to maintain the sail under desired attention at all times. A special run-way preferably guides the luff of the sail and the halyard which remains secured to the sail at all times, except when the sail is removed, for example for the purpose of changing sails.

Further provisions, details and modified embodiments of the present invention will be understood from the following description and the accompanying drawings which illustrate preferred embodiments of the invention and in which, FIG. 1 is a side view of the after section of a sailboat having a mast and boom and sail thereon;

FIG. 2 is a side view showing a major portion of the sail coiled up on the boom;

FIG. 3 is a perspective view illustrating a troughlike protective shield or covering for the boom;

FIG. 4 is a side view of the head portion of a sail;

FIG. 5 is a longitudinal section of the portion of a sail shown in FIG. 4;

FIG. 6 is a schematic side view of a sailing ship having fully automatic rigging in accordance with the present invention;

FIG. 7 is a side view of the upper portion of one of the sails on its respective mast;

FIGS. 8, 9 and 10 are various developments of guides on the mast for the sail and halyard;

FIG. 11 is a cross section of the foremast;

Figure 12:
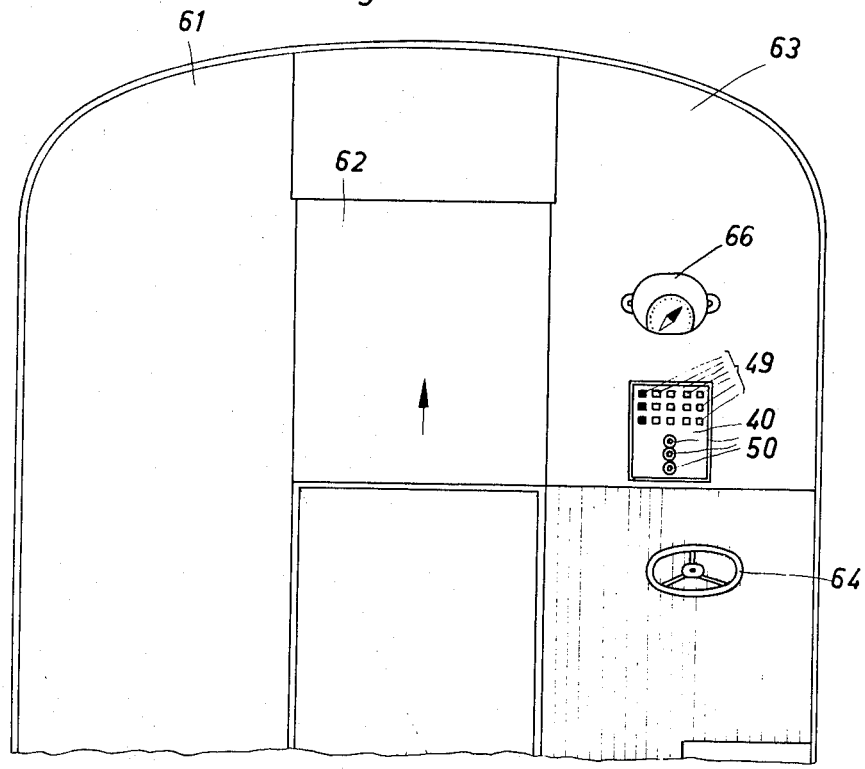
FIG. 12 shows a portion of the control room including a central control panel.

In FIG. 6, there is shown by way of example a sailboat having three masts, namely, a foresail mast 1, main mast 1' and missen mast 1". The number of masts and corresponding number of sails may be increased or decreased as desired depending on the size and rigging of the vessel. As the parts associated with each mast are essentially the same, it will be understood that where reference is herein made to only one mast and associated parts, the other mast and corresponding parts are designated with the same reference numerals with the addition of primes. The masts are slightly tapered and are mounted in the vessel so as to permit rotary motion of the masts about their respective longitudinal axes. Each of the masts is provided with a boom 6 which is mounted on the mast by means of a horizontal pivot pin 18 extending through a flanged bearing bushing in the mast and through opposite flange portions of a U-shaped supporting frame 19 which is secured to the forward end of the boom and straddles the mast. The free end of the boom is connected by a steel cable 4 to the top of the mast. The boom 6 is thus movable in a vertical direction about the pivot pin 18 insofar as permitted by the cable 4 and is swingable from side to side in a horizontal direction by rotation with the mast about the axis of the latter.

A gear wheel 8 is rotatably supported on the boom 6 at its forward end and is provided with a flanged disk 9 carrying a removable tubular drum 10 which extends substantially the full length of the boom and is rotatable thereon. A further flanged disk 11 is provided at the outer end of the drum 10. The gear wheel 8 meshes with a pinion 14 carried by a shaft 12, rotatably supported by a bow frame 3 mounted on the mast by being suspended from the supporting frame 19. The shaft 12 is driven by a reversible electrical motor A (B or C) through suitable reduction gears 16. The motor is also mounted on the supporting frame 3. A detachable crank handle 13 is preferably also provided for rotating the shaft 12 and hence drum 10 manually, for example in case of a power failure or other emergencies. The motor and associated transmission gearing is enclosed by means of a removable cover 51.

The foot of a sail 23 is secured to the rotatable drum 10 on the boom 6 so that the sail can be rolled up on or unwound from the drum 10 by rotation of the latter in one direction or the other. The head of the sail 23 is secured by suitable fitting to a halyard 27 which runs over a pulley 17 at the top of the mast and down to a windlass drum 15 mounted on the frame 3. The windlass drum may either be mounted directly on the end of shaft 12 as is the case on masts 1' and 1" in FIG. 6 or on a shaft connected to the shaft 12 by gears 20 as is the case on inclined mast 1 of FIG. 6. In either event, the drum 10 on which the sail is wound and the windless drum 15 on which the halyard 27 is wound are both driven by the motor A, B or C (or crank 13) in such manner that as the sail is hauled up by the halyard, it is unwound from the drum 10 and as the sail is wound up on the drum 10, either for storing of the sail or for reefing, the halyard is unwound from drum 15 so as to permit the sail to be hauled down. The diameters of the drums 10 and 15 and the gear ratios through which they are driven are such as to keep the sail tight at all times.

A trough-like container 25 (FIG. 3) having a cover which can be locked, may be removably mounted on the respective boom 6 so as to enclose the tubular drum 10 and protect it from injury.

The sail 23 may be made of suitable fabric such as cotton or dacron. Owing to the relatively severe stresses to which a sail may be subjected, it is expedient to make the upper portion of the sail of particularly resistant material. For this purpose, the sail may be reinforced by a cloth layer 24 as illustrated in FIGS. 4 and 5. The required strength may also be secured by impregnating the upper portions of the sail with plastic or other suitable material or by bonding one or more layers of plastic resilient material to the fabric of the sail. For example, as illustrated in FIG. 7, the sail may comprise sail cloth 33 and plastic material 34 overlying and bonded to the sail cloth in the upper portion of the sail. The upper tip portion 35 is further reinforced, for example by thin sheet metal to which the halyard 27 is attached. In some instances, it is desirable to make the upper portion of the sail of elastic material so as to maintain a selected tension on the sail at all times. Alternatively, the halyard 27 or a portion of the halyard may be made of elastic rope or cable.

Means is preferably provided on each of the masts for guiding the luff of the sail and the associated halyard. As illustrated by way of example in FIGS. 8 to 10, a guide 31 provided on the aft side of the mast 1 has lip portions defining a tubular channel receiving a rope 32 which is worked into the luff of the sail. As seen in FIG. 8, the sail material 33 passes around the rope 32 and is secured to itself to enclose the rope. The portion of the sail adjacent the rope 32 passes through a slot which is defined by the lip portions of the guide 31 and is sufficiently narrower to prevent the rope 32 from being pulled through. FIG. 9 illustrates how the reinforcing material 34 extends through the slot opening into the guide channel and around the rope 32. FIG. 10 illustrates how the reinforcing portion 35 extends through the slot in the guide and passes around and encloses the adjacent portion of the rope 32. As illustrated in FIG. 11, a guide 30 is provided for the halyard on the forward portion of the mast, this guide is similar to the guide 31 but may have a closed tubular channel since a slot for entry of a sail is not required.

The orientation or angular position of each boom with respect to the longitudinal axis of the vessel in controlled by a line (sheet) 53 passing through pulley blocks 50 and leading to a power winch below deck. One of the blocks 50 is secured to the free end of the boom 6 while the other is secured to the deck or other structure of the vessel. The winch is mounted in a casing or compartment 45 provided with a removable cover 46 which is flush with the deck 47. It comprises a drum 48 driven by a reversible electric motor I (II, III) through suitable transmission means illustrated as a chain or belt drive 56. The sheet 53 passes through an opening in the cover 46 and is guided by two pairs of rollers 54 and 55 disposed at right angles to one another. The winch is preferably located approximately on the center line of the boat and controls the position of the boom on either side of the center line depending on the direction of the wind. When it is desired to sail close-hauled, the line 53 is wound up on the winch drum 48 to pull the boom in at a sharp angle to the center line of the vessel. On a reach, or when running with the wind, the motor is reversed to let out the line so that the boom makes a larger angle with the center line.

The drive motors A, B, C for hauling the sails up and down and for reefing them to the desired extent may advantageously be direct current compound motors. The motors I, II, III for controlling the angular orientation of the booms are preferably variable speed motors operable for example in the range of 580 to 1000 revolutions per minute. In order to provide speed control, the motors I, II and III have shunt windings in addition to small compound windings. The speed of the motors is controlled by regulating resistances connected in circuit with the shunt windings so as to control field intensity. All of the motors are preferably provided with automatic brake means or locking devices for holding the motors in locked condition whenever they are stopped. The respective drums driven by the motors are thereby held in selected position. The motors and associated drive mechanism for all the masts are similar but may be of different sizes in accordance with the load on them. For example, the motors B and II for the mainsail may be larger and the motors for the jib and mizzen sail smaller.

For the motors A, B, C, a push-button control may advantageously be used so as to operate the roller drum 10 and windlass drum 15 in predetermined steps to provide the sail area desired. Thus, FIGURE 2 indicates schematically five different sail positions. Motors I, II, III are preferably controlled by rotary switches which provides stepless operation at infinitely variable speeds. This permits an exact positioning of the booms in accordance with the course being sailed and prevailing wind conditions.

Figure 13:
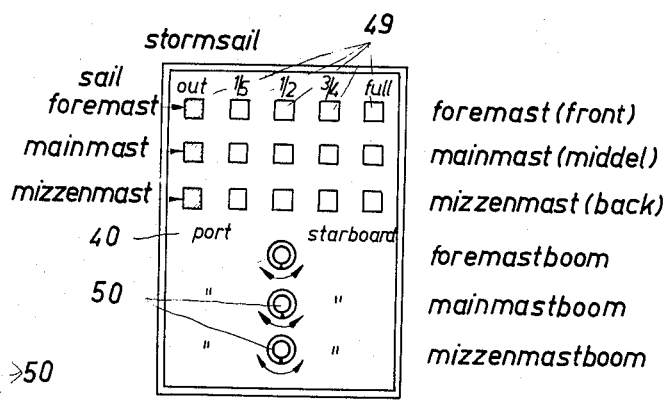
FIG. 13 is a view of the central control panel on a larger scale.
Figure 18:
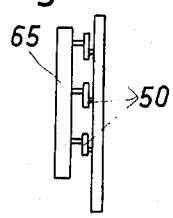
FIG. 18 is a side view of a fixture for controlling the orientation of all of the booms simultaneously.
Figure 14:
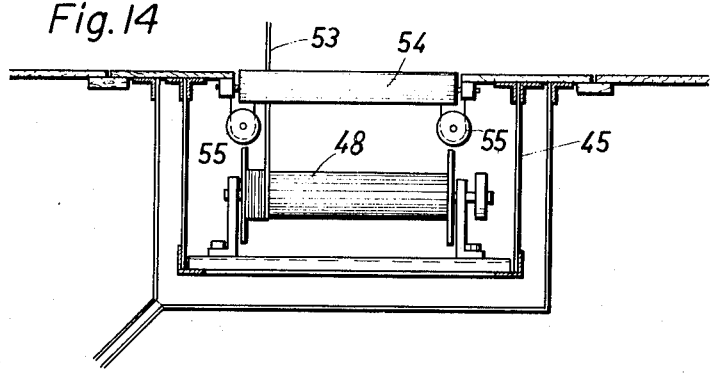
FIGS. 14 and 15 are schematic vertical sectional views at right angles to one another showing drive units for controlling the orientation of one of the booms.
Figure 15:
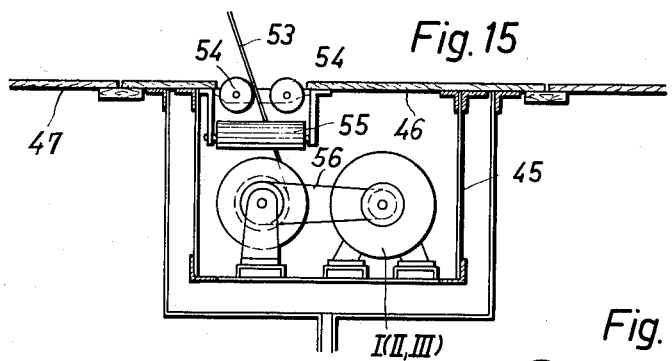
Figure 17:
FIG. 17 is a detail sectional view illustrating the seating of the housing cover shown in FIG. 16.
Figure 16:
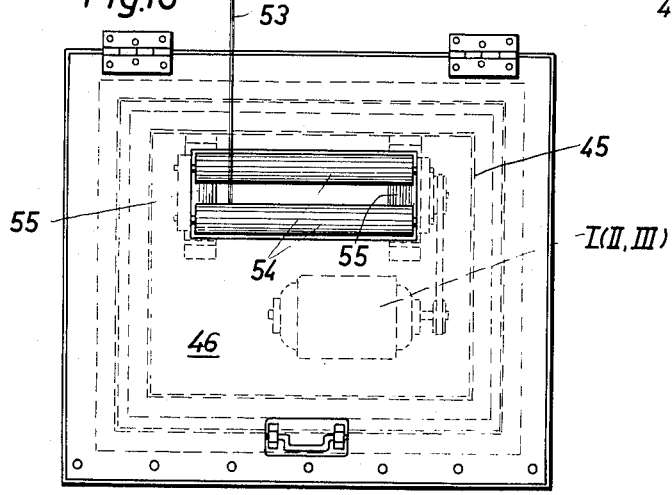
FIG. 16 is a top view showing the covered housing for one of the drive units controlling orientation of the booms.

All the sails of a multi-sail vessel are preferably controlled from a central controlled station. Such a station is illustrated in FIGS. 6, 12 and 13 as a control room located below deck. It comprises a hatchway 62 and is equipped with a chart table 61, order holding table 63, steering wheel 64, compass 66 and central control panel 40. As shown in more detail in FIG. 31, the control panel 40 has a series of push-buttons for each of the sails for controlling the motors A, B, C so as to have the sail all the way up, completely reeled on the drum 10, or at a selected intermediate position. The control panel 50 further comprises rotary switches 50—one for each of the motors I, II, III to control the angular position of each of the booms with respect to the center line of the boat. The rotary switches 50 may, if desired, be jointly actuated by means of a ruler 65 having pins which engage eccentrically the respective rotatable actuating means of the switches. In this manner, all of the rotary switches can be rotated jointly and uniformly.

The central control panel thus makes it possible for all of the sails to be controlled either jointly or independently, both as to sail area and angular position of the boom by a single attendant.

In, or adjacent to central control room, or at other convenient locations below the deck, there are provided batteries 43, a charging D.C. generator 41 driven by a diesel or other engine 42 together with safety fuses, automatic switches and relays for the light and power circuits in addition to the motor controls. Steering of the vessel by the rudder 67 is also controlled electrically through the steering wheel 64 so that a single attendant can have full control of the boat.

Thus, an attendant at the central control station has full control of the course of the vessel and the area and positioning of all of the sails. If it is desired to change a sail, this is readily done by pushing the button marked "out" (FIG. 13), for the particular sail on the control panel so as to coil the entire sail on the roller drum 10. The drum with the sail wound on it is then removed from the corresponding boom and replaced by another drum having a sail wound on it. The new sail is then hauled up to whatever position is desired, merely by pushing the corresponding button on the control panel.

While preferred embodiments of the invention have bene shown in the accompanying drawings and particularly described, it will be understood that the invention is in no way limited to the details of these embodiments and that the control system in accordance with the invention may be varied as desired within the scope of the invention as defined by the following claims.

What I claim is:

1. Control gear for sailboats having a plurality of sails and a mast and a boom for each of said sails, comprising a drum rotatable on each of said booms and secured to the foot of the respective sail, said sail being wound on said drum by rotation of the drum to reef the sail, a first windlass adjacent the forward end of each said boom, a halyard attached to the peak of each said sail and running over a pulley on the respective mast and down to the respective windlass for hoisting said sail, a first electric motor mounted adjacent the forward end of each said boom, driving connections between said motor, drum and windlass for each said sail such that as the sail is hoisted by said windlass, it is unwound from said drum and vice versa while at all times being kept tight, a second windlass mounted below the rear end of each said boom, a sheet attached to the rear end of each said boom and running to the respective second windlass whereby the angular position of said boom to the longitudinal center line of the boat is controlled by winding said sheet on said second windlass, a second electric motor for reversibly driving said second windlass to control said angular position of said boom and control circuitry including a control panel for selectively controlling all of said motors to control the height and angular position of each of said sails.

2. Control gear according to claim 1, in which a radially projecting annular flange is provided at each of opposite ends of each said drum.

3. Control gear according to claim 1, in which said first electric motors are operable by selected stages to hoist the respective sails to predetermined selected heights and in which said control panel comprises a plurality of push-buttons for each of said first electric motors with one of said pushbuttons for each of said stages whereby actuation of a selected push-butotn causes the respective motor to operate to raise or lower the respective sail to the corresponding selected height.

4. Control gear according to claim 1, in which said second electric motors are variable speed motors and in which said control panel comprises a rotatable control knob controlling each of said second electric motors to control the angular position of the respective sail.

5. Control gear according to claim 4, in which each of said second electric motors is a direct current motor with a shunt winding for controlling speed of the motor.

6. Control gear according to claim 1, in which each said sail has an elastic peak portion having the characteristic of stretching in a vertical direction and maintaining the sail tight.

7. Control gear according to claim 1, in which said halyard comprises an elastic portion having the characteristic of stretching and maintaining the sail tight.

8. Control gear according to claim 1, in which each said mast is provided with a longitudinally extending channel and in which the luff of the sail is secured to a rope running in said channel.

9. Control gear according to claim 1, in which at least one of said booms is provided with a plurality of said drums which are readily removable from said boom and are interchangeable, a sail being wound on each of said drums, whereby sails are quickly changed by removing one said drum and replacing it with another said drum.

10. Control gear according to claim 1, in which said second windlasses and driving motors are mounted below deck and in which guides are provided for said sheets extending from said booms to said second windlasses.

11. Control gear according to claim 10, in which each of said second windlasses and its driving motor is contained in a casing below decks and in which a removable top covers each of said casings and is provided with an opening through which the corresponding sheet winds and with guides for said sheet guiding said sheet through said opening.

References Cited by the Examiner

UNITED STATES PATENTS 3,149,603    9/1964    Sainte-Claire _____ 114—102

MILTON BUCHLER, *Primary Examiner.*

T. M. BLIX, *Assistant Examiner.*